(12) United States Patent
Joo et al.

(10) Patent No.: US 8,159,592 B2
(45) Date of Patent: Apr. 17, 2012

(54) PORTABLE TERMINAL

(75) Inventors: Won-Seok Joo, Seoul (KR); Choong-Hyoun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 12/263,259

(22) Filed: Oct. 31, 2008

(65) Prior Publication Data

US 2009/0115881 A1    May 7, 2009

(30) Foreign Application Priority Data

Nov. 2, 2007  (KR) .......................... 10-2007-0111782

(51) Int. Cl.
*H04N 5/222*  (2006.01)
*H04B 1/38*  (2006.01)
*H04M 1/00*  (2006.01)

(52) U.S. Cl. .............. 348/333.06; 348/333.07; 455/566; 455/575.3

(58) Field of Classification Search ............. 348/333.06, 348/333.07, 333.02; 455/556.1, 566, 552.1, 455/550.1, 557, 575.1, 90.2, 90.1

See application file for complete search history.

(56) References Cited

U.S. PATENT DOCUMENTS

2002/0018134 A1 * 2/2002 Tsukahara et al. ........ 348/333.01
2007/0274710 A1 * 11/2007 Dalby et al. .................. 396/448

\* cited by examiner

*Primary Examiner* — Lin Ye
*Assistant Examiner* — Mekonnen Dagnew
(74) *Attorney, Agent, or Firm* — Lee, Hong, Degerman, Kang & Waimey

(57) ABSTRACT

A portable terminal, comprises: a terminal body provided with a display unit to output visual information relating to a capturing mode, and having wireless communication functions; a touch input unit provided at the display unit, and configured to input information when at least one of the visual information is touched; a camera body arranged at the terminal body in a longitudinal direction, and rotatably coupled to the terminal body so that a direction of a camera mounted therein rotates in a perpendicular direction to the longitudinal direction of the terminal body; and camera manipulation units disposed on the camera body, and receiving input manipulations relating to an operation of the camera.

14 Claims, 11 Drawing Sheets

PORTABLE TERMINAL

RELATED APPLICATION

The present disclosure relates to subject matter contained in priority Korean Application 10-2007-0111782, filed on Nov. 2, 2007, which is herein expressly incorporated by reference in its entirety.

BACKGROUND OF THE INVENTION

1. Field of the Invention

The present invention relates to a portable terminal, and more particularly, to a portable terminal having a camera body rotatably coupled to a terminal body.

2. Background of the Invention

In general, a portable terminal is a device that can be carried around and has one or more functions such as to perform voice and video call communications, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions.

As the portable terminal is regarded as a personal belonging to express a user's personality, various designs are required.

It is a recent trend for a user to upload captured photos or moving images, and more functions of the portable terminal become intensified. Accordingly, various attempts have been made to present a portable terminal having a structure to allow a user to more conveniently capture photos or moving images.

SUMMARY OF THE INVENTION

Therefore, an object of the present invention is to provide a portable terminal having a structure to allow a user to more conveniently capture photos or moving images.

To achieve these and other advantages and in accordance with the purpose of the present invention, as embodied and broadly described herein, there is provided a portable terminal, comprising: a terminal body provided with a display unit to output visual information relating to a capturing mode, and having wireless communication functions; a touch input unit provided at the display unit, and configured to input information when at least one of the visual information is touched; a camera body arranged at the terminal body in a longitudinal direction, and rotatably coupled to the terminal body so that a direction of a camera mounted therein rotates in a perpendicular direction to the longitudinal direction of the terminal body; and camera manipulation units disposed on the camera body, and receiving input manipulations relating to an operation of the camera.

According to another aspect of the present invention, there is provided a portable terminal, comprising: a terminal body provided with a display unit to output visual information relating to a capturing mode, and having wireless communication functions; a touch input unit provided at the display unit, and configured to input information when at least one of the visual information is touched; a camera body arranged at the terminal body in a longitudinal direction, and rotatably coupled to the terminal body so that a direction of a camera mounted therein rotates in a perpendicular direction to the longitudinal direction of the terminal body; and an audio output unit disposed on the camera body, and configured to output audio signals transmitted from the terminal body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a portable terminal according to the present invention will be explained in more detail.

Figure 1:
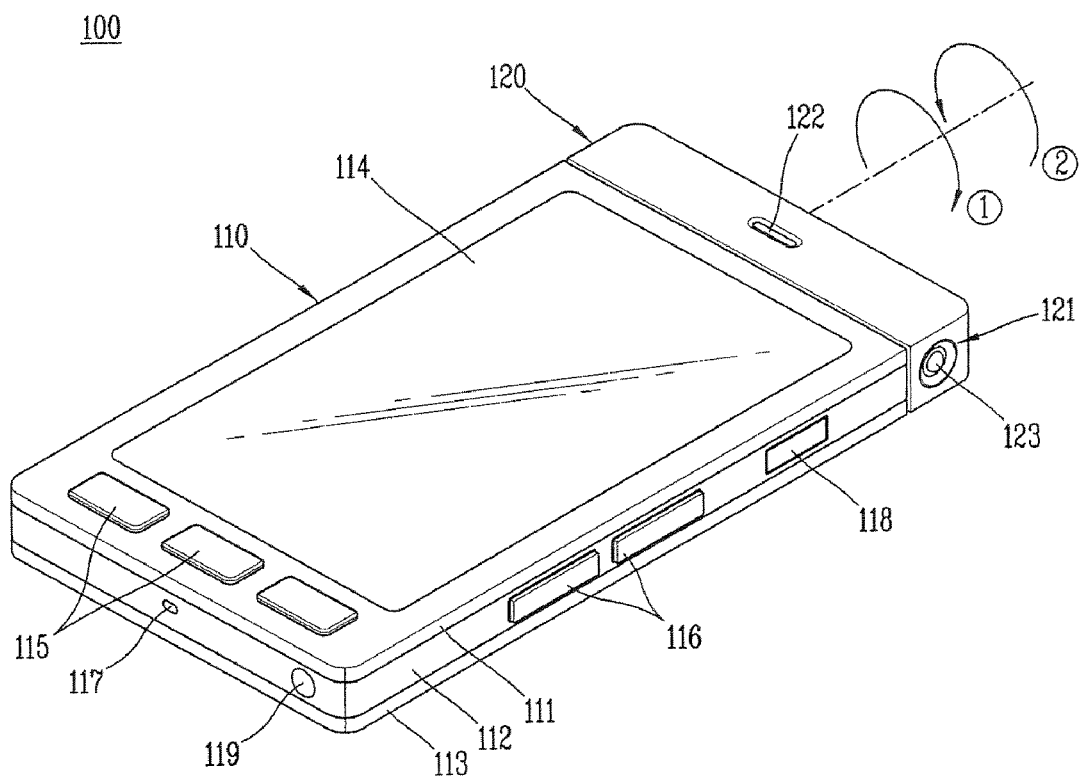
FIG. 1 is a front perspective view showing a portable terminal according to a first embodiment of the present invention.

FIG. 1 is a front perspective view showing a portable terminal 100 according to a first embodiment of the present invention.

The portable terminal 100 according to the present invention comprises a terminal body 110, and a camera body 120 rotatably coupled to one side of the terminal body 110.

A case (casing, housing, cover, etc.) forming an external appearance of the terminal body 110 is comprised of a front case 111, a middle case 112, and a rear case 113. Each kind of electronic components are mounted in a space formed by the front case 111 and the rear case 112, and a space formed by the middle case 112 and the rear case 113.

Here, the cases may be formed of an injection molded plastic, or formed using metallic material (e.g., stainless steel (STS), titanium (Ti), or the like). The case may be comprised of the front case 111 and the rear case 113 without the middle case 112.

A display unit 114 and a first user input unit 115 may be disposed at the terminal body 110, more concretely, the front case 111.

The display unit 114 may include a Liquid Crystal Display (LCD) module, an Organic Light Emitting Diodes (OLED) module, or the like. The display unit 114 may be further provided with a touch input unit so as to implement a touch screen function.

The first user input unit 115 is configured to receive input commands to control the operation of the portable terminal 100 according to a first embodiment of the present invention.

A second user input unit 116, an audio input unit 117, and an interface unit 118 may be disposed at the middle case 112.

The first and second user input units 115 and 116 may be referred to as manipulating portions', and may be implemented to have any structures only if they can be manipulated in a user's tactile manner.

The user input units 115 and 116 may be implemented as dome switches or touch pads to receive information input in a user's push or touch manner, or may be implemented as jog wheels, jog sticks, and the like.

In the aspect of functions, the first user input unit 115 may serve to input various commands such as start, stop, and scroll commands, and the second manipulating unit 116 may serve as hot keys configured to perform specific functions such as activation of the display unit 114.

The audio input unit 117 configured to receive a user's voice, other sounds, etc. may be implemented as a microphone.

The interface unit 118 may serve as a passage through which the portable terminal 100 of the present invention can exchange data with external devices. The interface unit 119 may be implemented by wire or by radio, and may include one of an access port to an earphone, a short-range communication port (e.g., IrDA port, Bluetooth port, wireless LAN port, and the like), and a power supply port for supplying power to the portable terminal.

The interface unit 118 may be a card socket for receiving an external card such as a subscriber identification module (SIM), a User Identification Module (UIM), and a memory card for storing information A power supply unit 119 for supplying power to the portable terminal 100 may be mounted in the rear case 113. The power supply unit 119 may be implemented as a chargeable battery, and may be detachably mounted to outside of the terminal body 110.

A broadcast signal receiving antenna 119 may be disposed at one side of the terminal body 110, in addition to an antenna for communications. The broadcast signal receiving antenna 119 may be configured to retract into the terminal body 110, or may be mounted in the terminal body 110 as a built-in antenna.

The camera body 120 is rotatably connected to the terminal body 110 so as to be disposed in a longitudinal direction of the terminal body 110. The camera 121 configured to capture a user's still images or moving images, and each kind of electronic components are mounted in the camera body 120.

The camera body 120 is rotatably coupled to the terminal body 110 so that a direction of a camera 121 mounted therein is perpendicular to the longitudinal direction of the terminal body 110. That is, the camera body 120 is mounted to the terminal body 110 so that a rotation shaft thereof is perpendicular to a width direction of the terminal body 110.

As shown in FIG. 1, the terminal body 110 and the camera body 120 may implement a bar type of portable terminal by being combined with each other, which will be referred to as 'first status'.

The camera body 120 may be mounted to an upper side of the terminal body 110. An audio output unit 122 may be mounted to the camera body 120, and the audio output unit 122 may be implemented as a receiver or a speaker.

The camera 121 is mounted to the camera body 120 so that a direction of a lens 123 is perpendicular to an output direction of the display unit 114 in the first status. That is, the camera 121 may be mounted to the camera body 120 so that the lens 123 is located at a side surface of the camera body 120. Here, the camera 121 may be implemented so that the lens 123 mounted therein can be linearly moved for an optical zoom function.

The camera body 120 may be configured to be perpendicular to the terminal body 110 by being rotated from the first status, which will be referred to as 'second status'.

Figure 2:
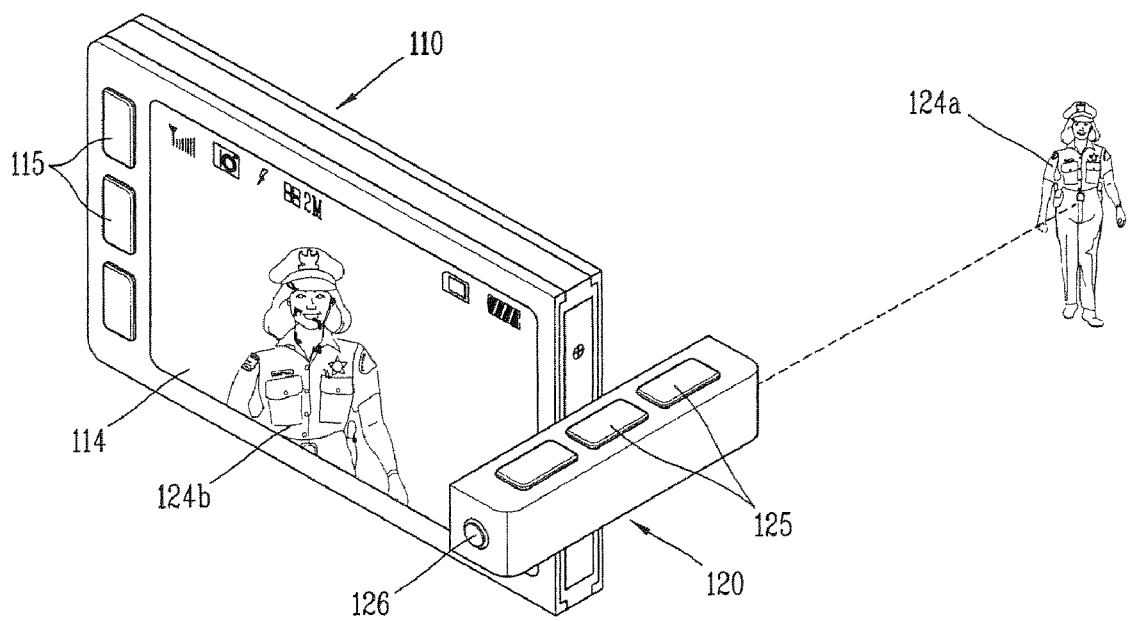
FIGS. 2 and 3 are perspective views showing a second status of the portable terminal of FIG. 1.
Figure 3:
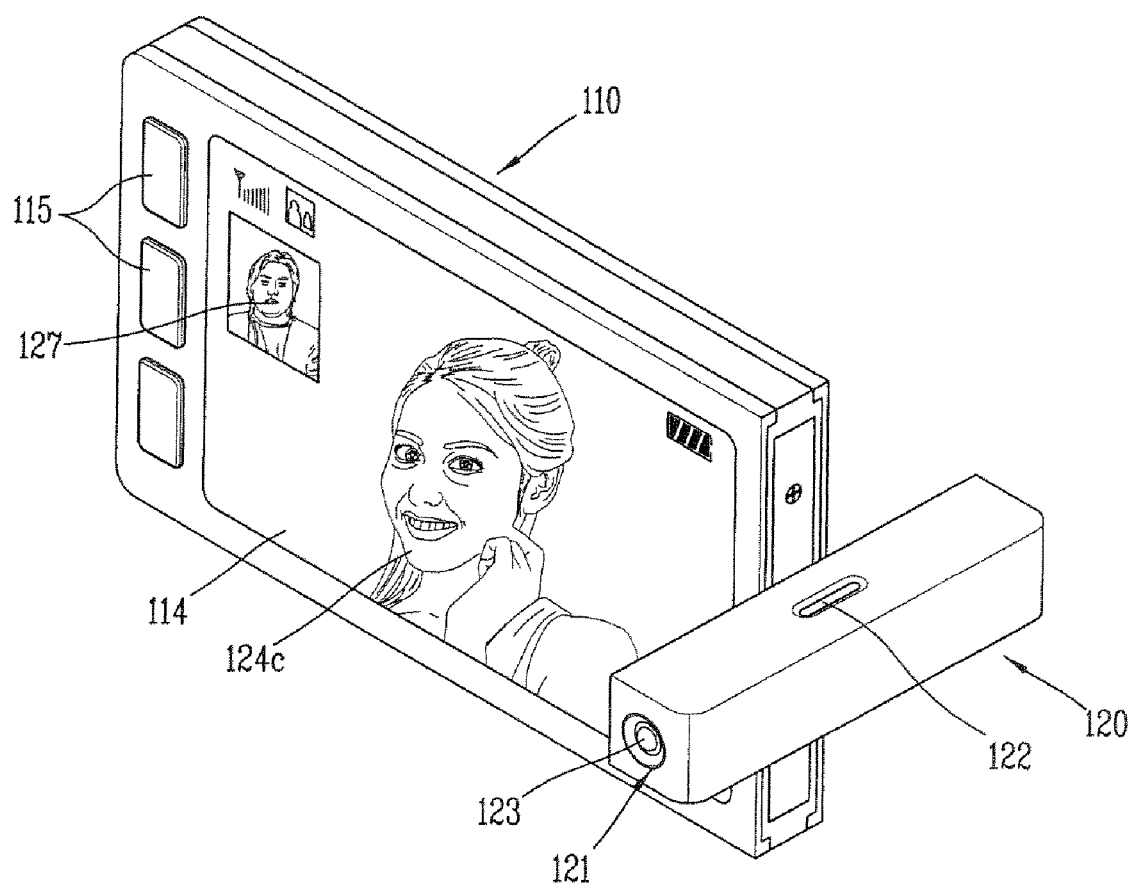

FIGS. 2 and 3 are perspective views showing a second status of the portable terminal 100 of FIG. 1, in which FIG. 2 shows that the camera body 120 is rotated in a direction of ① of FIG. 1, whereas FIG. 3 shows that the camera body 120 is rotated in a direction of ② of FIG. 1.

As shown in FIG. 2, a status that a direction of the camera 121 is opposite to an output direction of the display unit 114 will be referred to as 'forward rotation status'. And, as shown in FIG. 3, a status that a direction of the camera 121 is same as an output direction of the display unit 114 will be referred to as 'backward rotation status'.

The portable terminal 100 shown in FIG. 2 is implemented by rotating the camera body 120 in a direction of ① from the first status of FIG. 1, and by rotating the terminal body 110 so that a longitudinal direction of the terminal body 110 is parallel to the ground.

When the camera body 120 is in a 'forward rotation status' as shown in FIG. 2, a user may capture a subject 124a located at an opposite direction to an output direction of the display unit 114. More concretely, since a direction of the lens 123 of the camera 121 is consistent with a user's eyes direction, the subject 124a located at an opposite side to the user may be captured.

A plurality of camera manipulation units 125 configured to manipulate the camera may be mounted onto the camera body 120. A subject 124b captured by the camera is displayed on the display unit 114. Here, a user may capture the subject 124a by manipulating the camera manipulation units 125 with watching the subject 125b displayed on the display unit 114.

The camera manipulation units 125 may be mounted to an opposite side to a side where the audio output unit 122 is positioned. And, the camera manipulation units 125 may be implemented as a zoom key to control a size of the subject 125b output to the display unit 114, a reproduction key to reproduce captured photos or moving images, an edition key to edit captured photos or moving images, a menu key to display menus relating to the operation of the camera to the display unit 114 or to select the displayed menus, and the like.

The camera manipulation units 125 may include a shutter key 126 to capture photos by the camera, and the shutter key 126 may be disposed at an opposite side to a side where the camera is mounted.

The portable terminal 100 shown in FIG. 3 is implemented by rotating the camera body 120 in a direction of ② from the first status of FIG. 1, and by rotating the terminal body 110 so that a longitudinal direction of the terminal body 110 is parallel to the ground.

When the camera body 120 is in a 'backward rotation status' as shown in FIG. 3, a user may capture a subject located in the same direction as an output direction of the display unit 114. More concretely, since a direction of the lens 123 of the camera 121 is towards the user, the user may capture himself or herself by using the camera 121.

The user may perform a self capturing to capture himself or herself in the form of still images or moving images, or may perform a self capturing to transmit himself or herself to another party for a video call.

FIG. 3 shows that a user performs a video call with another party. On the display unit 114, not only the user 124c, but also another party 127 that performs a call with the user 124c may be displayed.

When the camera body 120 is in a forward rotation status or a backward rotation status, the camera 121 may be controlled by the camera manipulation units 125 and 126 of the camera body 120, or may be controlled by the first and second manipulation portions 115 and 116 of the terminal body 110, or the touch input unit of the display unit 114.

Figure 4A:
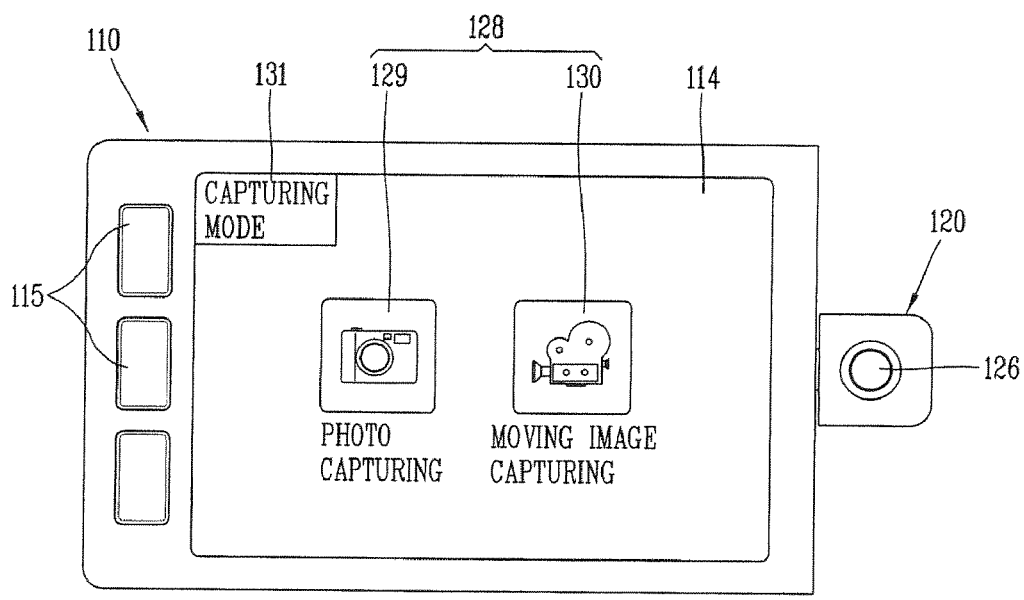
FIGS. 4A and 4B are front planar views showing the portable terminal of FIGS. 2 and 3.
Figure 4B:
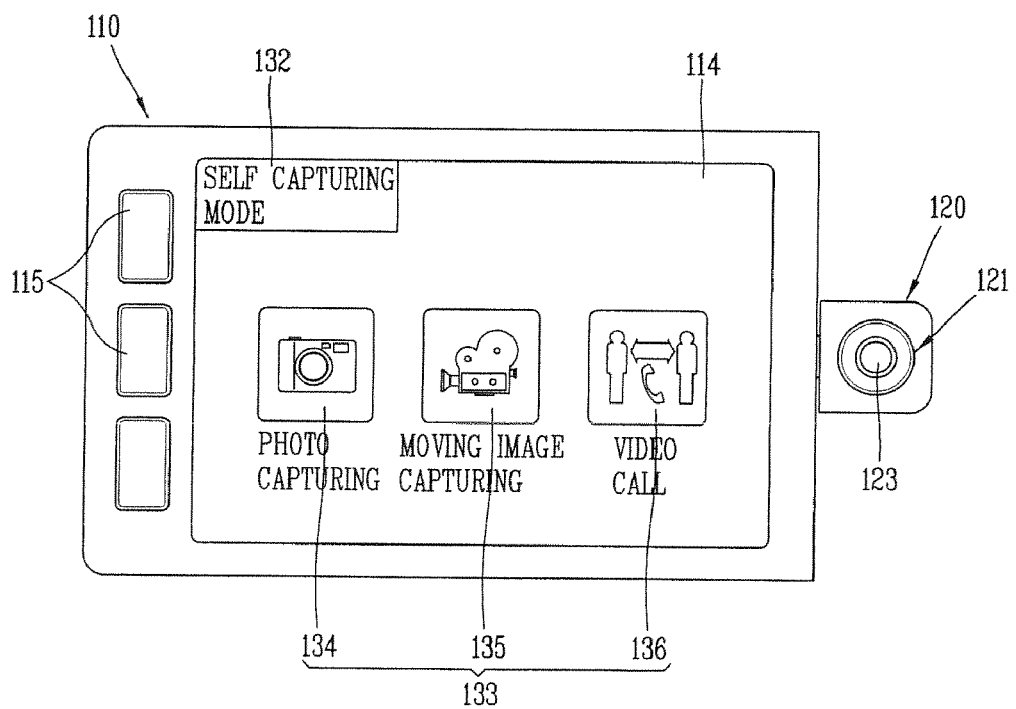

FIGS. 4A and 4B are front planar views showing the portable terminal 100 of FIGS. 2 and 3 to explain an operational status of the portable terminal 100.

Various visual information that can be input in a touch manner may be output to the display unit 114. The visual information may be displayed in the form of texts, numbers, symbols, graphics, or icons. For information input, at least one of the texts, numbers, symbols, graphics, and icons are displayed in a constant arrangement in the form of a keypad, that may be called as 'soft keys'.

When the portable terminal is in the first status shown in FIG. 1, wireless communication such as a call function and a text message transmitting/receiving function are mainly performed.

For instance, soft keys indicating numbers for phone number input may be output to the display unit in a call mode, and a user may input a desired phone number by touching the soft keys. In this case, the first user input unit 115 may serve as a key to connect to the input phone number, to cancel the input phone number, or to end the call mode, and the like.

As shown in FIGS. 4A and 4B, once the camera body 120 is rotated to the second status from the first status, a mode set 128 to select operations relating to a function of the camera may be output to the display unit 114. For a user's convenience, it is preferable for the mode set 128 to be automatically output to the display unit 114 when the camera body 120 is in the second status.

Referring to FIG. 4A, when the camera body 120 is in a forward rotation status, the current mode of the portable terminal 100 is converted into a capturing mode 131 to capture the subject 124a of FIG. 2, and the capturing mode 131 is displayed on the display unit 114.

The mode set 128 in the capturing mode 131 may include a photo capturing mode 129 and a moving image capturing mode 130. Once the photo capturing mode 129 and the moving image capturing mode 130 are displayed on the display unit 114 in the form of menus or icons, a user may select one of them to operate a corresponding function. Here, the user may perform an input operation by directly touching the menus or icons, or by manipulating the first and second user input units 115 and 116, and the like.

Referring to FIG. 4B, when the camera body 120 is in a backward rotation status, the current mode of the portable terminal 100 is converted into a self capturing mode 132 to capture himself or herself, and the self capturing mode 132 is displayed on the display unit 114.

A mode set 133 in the self capturing mode 132 may include a photo capturing mode 134, a moving image capturing mode 135, a video call mode 136, and the like. A user may select one of the modes to perform a corresponding function.

Figure 5:
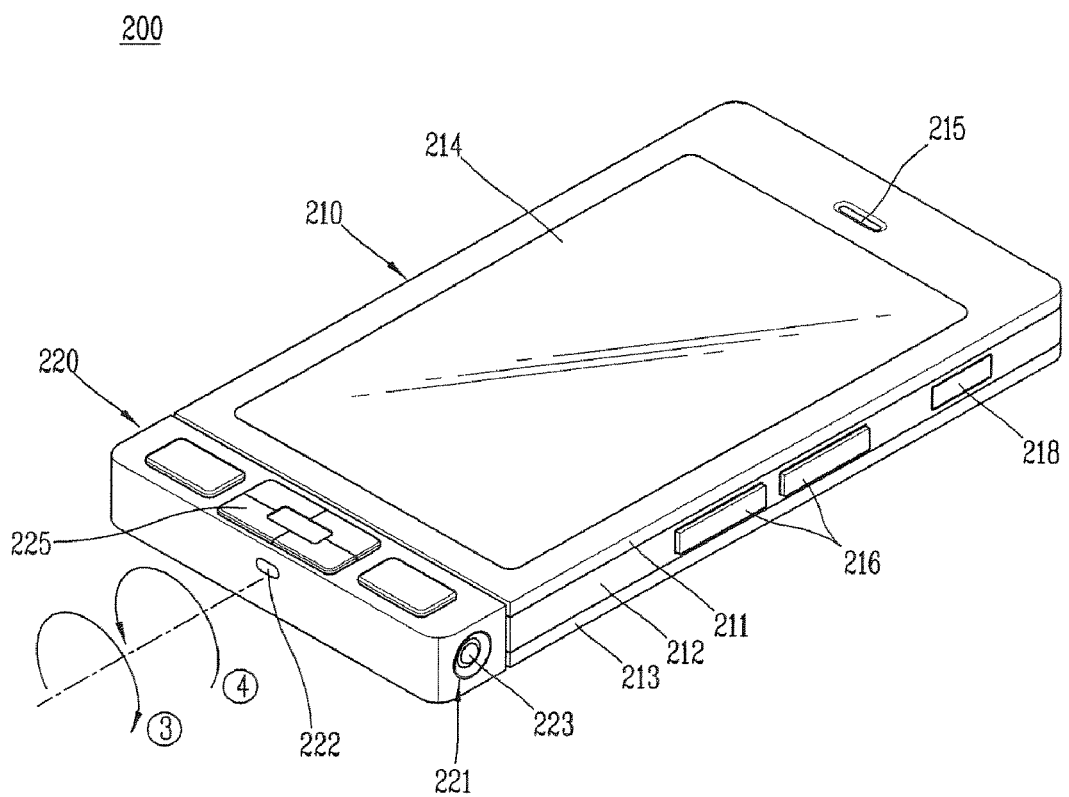
FIG. 5 is a perspective view showing a portable terminal according to a second embodiment of the present invention.

FIG. 5 is a perspective view showing the portable terminal 100 according to a second embodiment of the present invention.

The portable terminal 200 according to a second embodiment of the present invention comprises a terminal body 210, and a camera body 220 rotatably connected to the terminal body 210. Another parts except the camera body 220 of the portable terminal 200 have the same configurations as those of the portable terminal 100. The same parts of FIG. 5 as those of the portable terminal 100 will be given the same reference numerals.

In the portable terminal 200, the camera body 220 is mounted to a lower side of the terminal body 210, and an audio output unit 215 configured to output audio may be provided at a front case 211 of the terminal body 210.

An audio input unit 222 configured to input audio may be mounted to one side of the camera body 220 in the form of a microphone.

A camera manipulation unit 225 mounted to the camera body 220 may be configured to input commands to control the terminal body 210. That is, the camera manipulation unit 225 may be configured to serve as the first user input unit 115 of the first embodiment. More concretely, the camera manipulation unit 225 may be configured to input commands such as call connection, call cancel, and call end in the first status.

The camera body 220 is configured to be rotatable like the camera body 120 of the first embodiment, and is rotated in a direction of ③ or ④, thereby converting the current mode of the portable terminal 100 into the second status.

Figure 6:
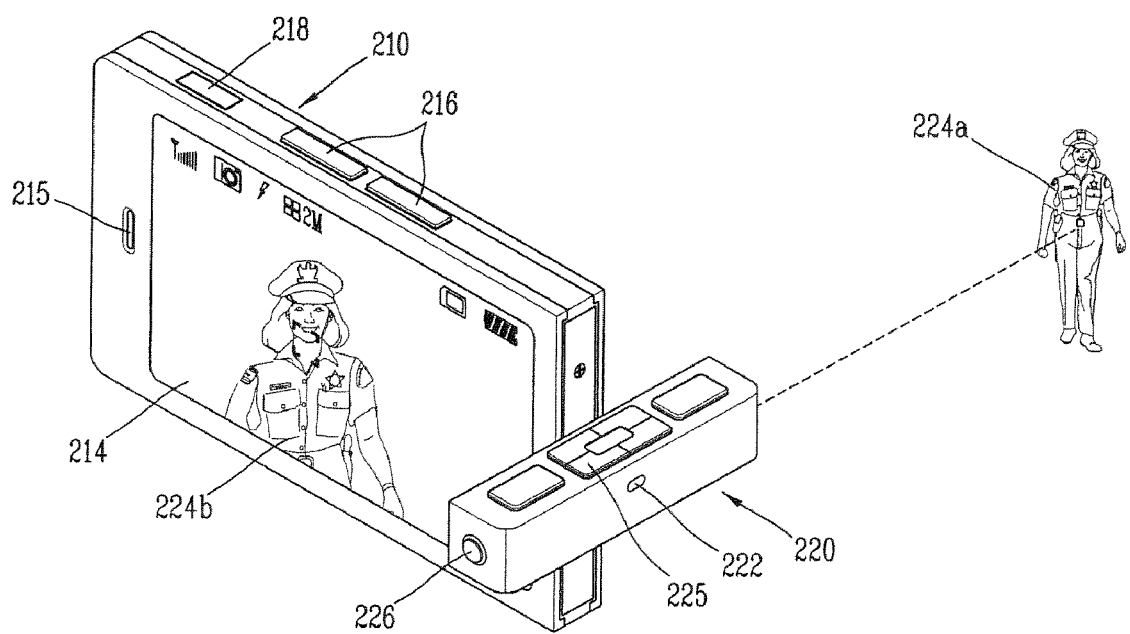
FIG. 6 is a perspective view showing a second status of the portable terminal of FIG. 5.

FIG. 6 is a perspective view of the portable terminal, which shows that the camera body 220 has been rotated in a direction of ③. A status that the camera body 220 has been rotated in a direction of ④ is not shown.

Referring to FIG. 6, when the camera body 220 is in a forward rotation status, a user may capture a subject 224a located at an opposite side to the display unit 214 through the camera manipulation unit 225.

Here, the camera manipulation unit 225 may be arranged in one row along a longitudinal direction of the camera body 220. As the camera manipulation unit 225 is arranged in one row in a minimized space, the display unit 214 may have a maximized size within the limited space. This structure is more preferable in the case that the display unit 214 occupies most of the front case 211, and may be also applied to the camera manipulation unit 125 of the first embodiment.

In the same manner as the first embodiment, the camera manipulation unit 225 may include a shutter key 226 disposed at an opposite side to a side where a camera 223 is mounted, and configured to capture photos. And, the camera manipulation unit 225 may be implemented as a zoom key to control a size of a subject output to the display unit 214, a reproduction key to reproduce captured photos or moving images, an edition key to edit captured photos or moving images, a menu key to display menus relating to the operation of the camera 223 to the display unit 214 or to select the displayed menus, and the like.

As shown in FIG. 6, the camera manipulation unit 225 may be mounted to a front surface of the camera body 220. Although not shown, the camera manipulation unit 225 may be mounted to a rear surface and a side surface of the camera body 220.

A hinge module 240 configured to stop the camera body 220 being rotated at constant angles may be mounted between the terminal body 210 and the camera body 220.

Figure 7:
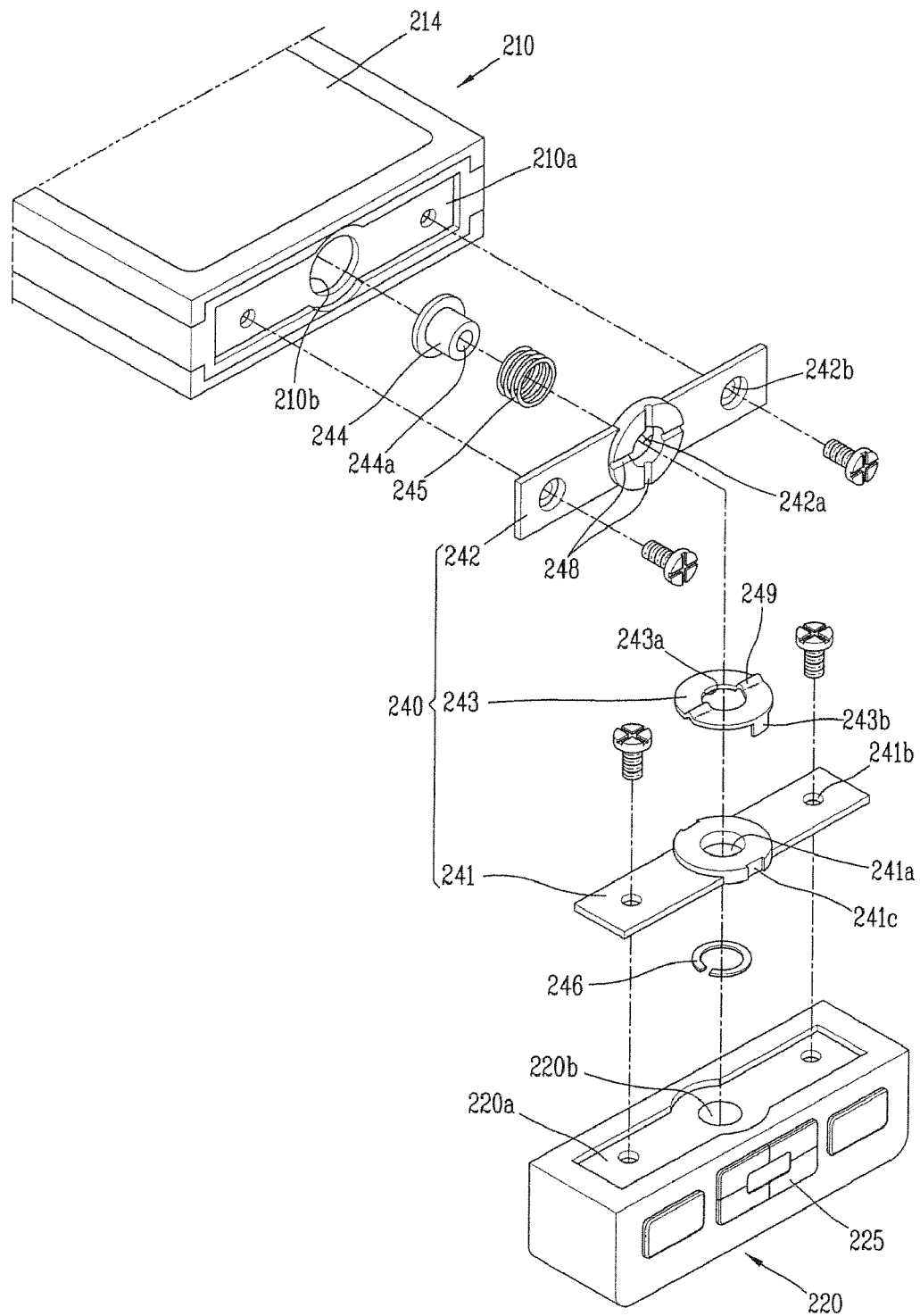
FIG. 7 is an exploded perspective view of a hinge module according to one example of the present invention.

FIG. 7 is an exploded perspective view of a hinge module 240 according to one example of the present invention.

The hinge module 240 according to the second embodiment includes a first hinge member 241 fixed to the camera body 220, a second hinge member 242 fixed to the terminal body 210, and a first elastic stopper 243 locked by the first hinge member 241 and rotated together with the first hinge member 241.

The first and second hinge members 241 and 242, and the first elastic stopper 243 are provided with through holes 241a, 242a, and 243a for passing a shaft 244, respectively.

Mounting grooves 210a and 220a having shapes corresponding to the second and first hinge members 242 and 241, and configured to mount the second and first hinge members 242 and 241 may be provided at the terminal body 210 and the camera body 220, respectively. Here, the first and second hinge members 241 and 242 may be fixed to the mounting grooves 210a and 220a in a screw coupling manner. To this end, screw holes 241b and 242b may be formed at the first and second hinge members 241 and 242, respectively.

Through holes 210b and 220b for passing a cable to electrically connect the terminal body 210 and the camera body 220 with each other may be formed at the mounting grooves 210a and 220a. The cable serves to connect the terminal body 210 and the camera body 220 with each other through a through hole 244a of the shaft 244.

A locking groove 241c for locking the first elastic stopper 243 may be formed at the first hinge member 241. And, a locking protrusion 243b inserted into the locking groove 241c, and restricting relative rotation between the first elastic is stopper 243 and the first hinge member 241 may be formed at the first elastic stopper 243. Here, the locking groove 241c may be formed at the first elastic stopper 243, and the locking protrusion 243b may be formed at the first hinge member 241. The first hinge member 241 and the first elastic stopper 243 may be integrally formed with each other.

A stopping groove 248 concaved in a shaft direction is provided at the second hinge member 242. The stopping groove 248 may be formed in a long shape in a radius direction, and may be implemented in plurality in number with a constant angle therebetween corresponding to an angle at which the camera body 220 is to be stopped. In this embodiment, the stopping groove 248 is formed in four with an angle of 90° therebetween so as to stop the camera body 220 being rotated at each angle of 90°.

Protrusions 249 protruding towards the stopping grooves 248 are formed at the first elastic stopper 243, and are formed so as to be locked by the stopping grooves 248 by its elastic operation. The first elastic stoppers 243 may be formed in a plate spring shape, and are formed to have a shape corresponding to a shape of the stopping grooves 248. Here, the stopping grooves 248 and the protrusions 249 may be formed to have inclined surfaces so as to release a locked status of the protrusions 249 according to relative rotation.

A spring 245 for pressing the second hinge member 242 towards the first hinge member 241 may be mounted between the shaft 244 and the second hinge member 242.

Once the spring 245, the second hinge member 242, the first elastic stopper 243, and the first hinge member 241 are inserted into the shaft 244, a snap ring 246 is fitted into the end of the shaft 244. As a result, an assembly process for the hinge module 240 is completed.

Figure 8A:
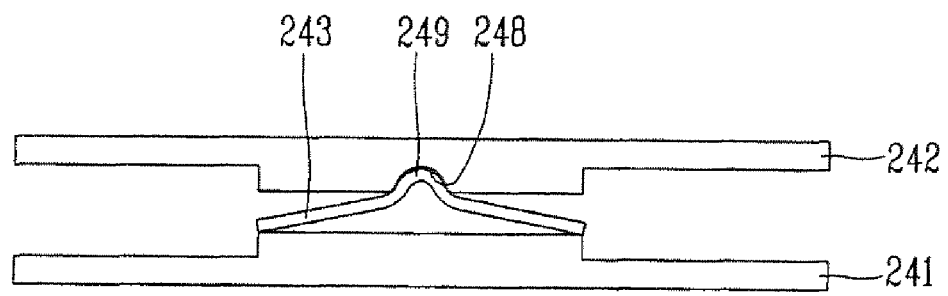
FIGS. 8A and 8B are side views of the hinge module of FIG. 7, which show an operational status of the hinge module, respectively.
Figure 8B:
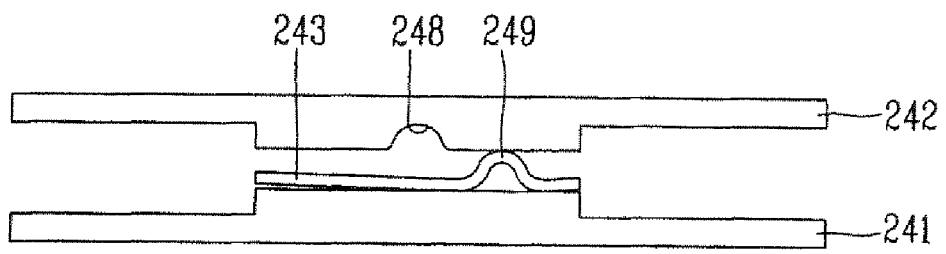

FIGS. 8A and 8B are side views of the hinge module 240 of FIG. 7, which show an operational status of the hinge module 240, respectively.

FIG. 8A shows a status that the camera body 220 is in the first or second status as the protrusions 249 are locked by the stopping grooves 248.

Under this status, when a user rotates the camera body 220, the protrusions 249 are elastically transformed due to a rotation force of the camera body 220, which causes a locked status of the protrusions 249 by the stopping grooves 248 to be released. Accordingly, the first hinge member 241 and the first elastic stopper 243 perform a relative rotation with respect to the second hinge member 242.

Referring to FIG. 8A, once the camera body 220 being rotated is disposed at a certain angle, the protrusions 249 are locked by the stopping grooves 248, which stops the relative rotation of the first hinge member 241 and the first elastic stopper 243 with respect to the second hinge member 242. As a result, the camera body 220 may be stopped at a certain angle.

In this preferred embodiment, the first hinge member 241 is fixed to the camera body 220, and the second hinge member 242 is fixed to the terminal body 210. On the contrary, the first hinge member 241 may be fixed to the terminal body 210, and the second hinge member 242 may be fixed to the camera body 220.

Figure 9:
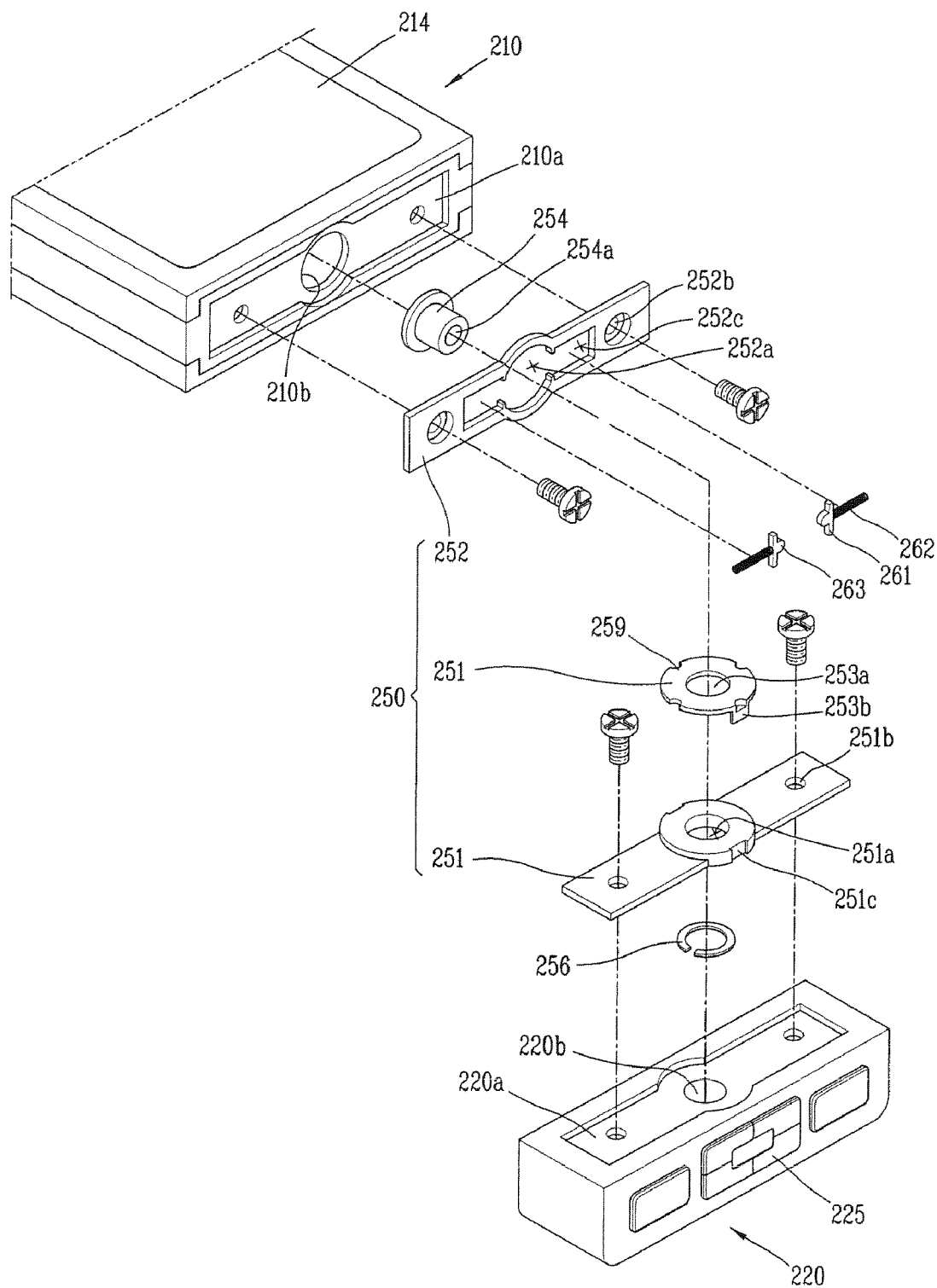
FIG. 9 is an exploded perspective view of a hinge module according to another example of the present invention.

FIG. 9 is an exploded perspective view of a hinge module 250 according to another example of the present invention.

The hinge module 250 includes a first hinge member 251 fixed to the camera body 220, a second hinge member 252 fixed to the terminal body 210, a cam member 253 locked by the first hinge member 251 and rotated together with is the first hinge member 251, and second elastic stoppers 261 locked by the second hinge member 252 and rotated together with the second hinge member 252.

The respective couplings between the camera body 220 and the first hinge member 251, between the first hinge member 251 and the cam member 253, and between the terminal body 210 and the second hinge member 252 are same as those of the aforementioned embodiment, and their detailed explanations will be omitted. Here, the cam member 253 may be integrally formed with the first hinge member 251.

Stopping grooves 259 concaved in a radius direction are provided on an outer circumference of the cam member 253, and may be formed with a constant interval therebetween corresponding to an angle at which the camera body 220 being rotated is to be stopped.

The second elastic stoppers 261 are provided with protrusion members 263 protruding towards the stopping grooves 259, and are formed so as to be locked by the stopping grooves 259 by an elastic operation. The protrusion members 263 are elastically supported by springs 262.

The second hinge member 252 is provided with accommodation spaces 252c at both sides of a rotation shaft. And, the protrusion members 263 are mounted to the accommodation spaces so as to be linearly moveable at both sides of the rotation shaft. End portions of the protrusion members 263 may be formed in shapes corresponding to shapes of the stopping grooves 259 so as to be locked by the stopping grooves 259.

Figure 10A:
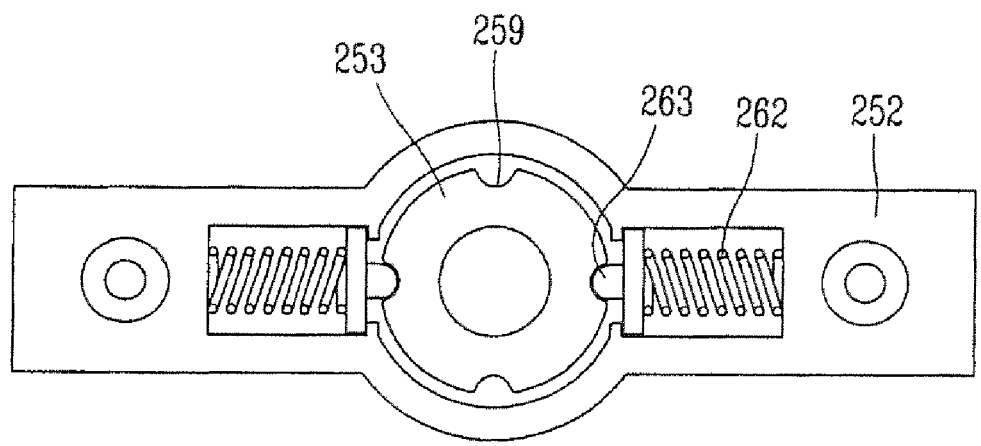
FIGS. 10A and 10B are sectional views of the hinge module of FIG. 9, which show an operational status of the hinge module, respectively.
Figure 10B:
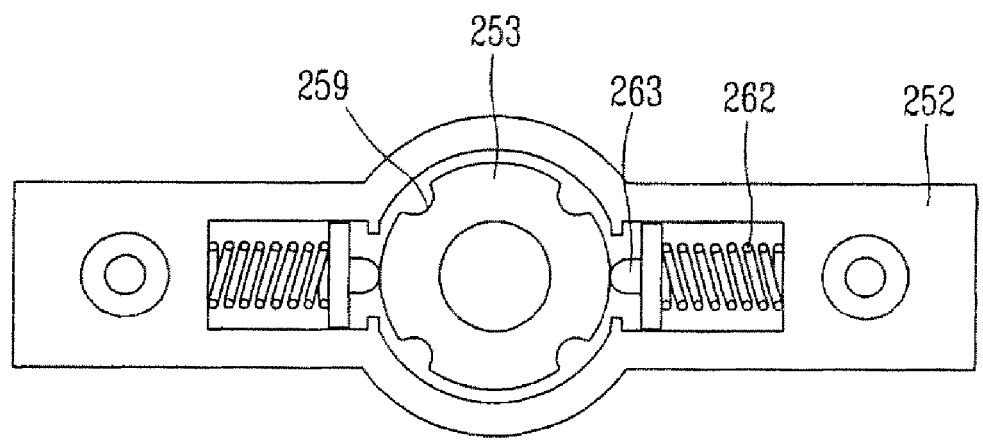

FIGS. 10A and 10B are sectional views of the hinge module 250 of FIG. 9, which show an operational status of the hinge module 250, respectively.

FIG. 10A shows a status that the camera body 220 is in the first or second status as the protrusion members 263 are locked by the stopping grooves 259 of the cam member 253.

Under this status, when a user rotates the camera body 220, the protrusion members 263 are linearly moved at both sides of a rotation shaft due to a rotation force of the camera body 220, which is shown in FIG. 10B. Accordingly, the locked status of the protrusion members 263 by the stopping grooves 259 is released. As a result, the first hinge member 251 and the cam member 253 perform relative motion with respect to the second hinge member 252.

Referring to FIG. 10A, once the camera body 220 being rotated is disposed at a constant angle, the protrusion members 263 are locked by the stopping grooves 259 due to an elastic force of the springs 262. Accordingly, a relative rotation between the first hinge member 251 and the second elastic stoppers 261 may be stopped, and the camera body 220 being rotated with respect to the terminal body 210 may be stopped at the constant angle.

The above explanations are based on a case that the first hinge member 251 is fixed to the camera body 220, and the second hinge member 252 is fixed to the terminal body 210. However, it is also possible that the first hinge member 251 is fixed to the terminal body 210, and the second hinge member 252 is fixed to the camera body 220.

The above explanations are also based on a case that the hinge modules 240 and 250 are mounted to the portable terminal 200 of FIG. 5. However, the hinge modules 240 and 250 may be also applied to the portable terminal 100 of FIG. 1.

Figure 11:
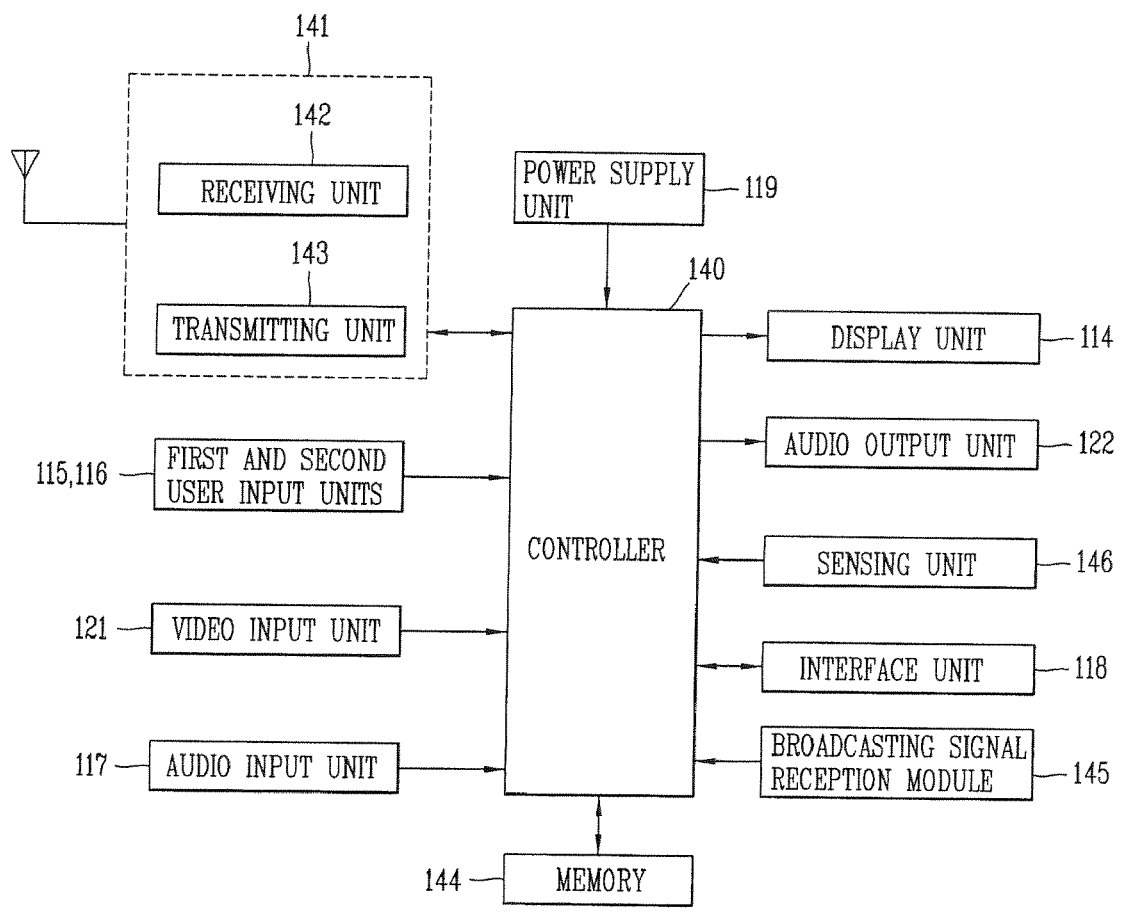
FIG. 11 is a block diagram showing a portable terminal according to the present invention.

FIG. 11 is a block diagram showing the portable terminal 100 according to the present invention. The block diagram is based on the portable terminal 100 of FIG. 1, but may be based on the portable terminal 200 of FIG. 5.

Referring to FIG. 11, the portable terminal 100 according to the first embodiment of the present invention comprises a wireless communication module 141, first and second user input units 115 and 116, a camera 121, an audio input unit 117, a display unit 114, an audio output unit 122, a sensing unit 146, an interface unit 118, a broadcasting signal reception module 145, a memory 144, a power supply unit 119, and a controller 140.

The controller 140 controls an entire operation of the portable terminal. For instance, the controller 140 performs controls and processes relating to voice communication, data communication, video communication, and the like.

The controller 140 controls an entire operation of the camera body 120 relating to the camera 121 as well as the general functions.

The wireless communication module 141 transmits/receives wireless signals to/from a base station through an antenna. For instance, the wireless communication module 141 transmits/receives voice data, text data, image data, and control data under control of the controller 140. The wireless communication module 141 includes a transmitting unit 142 for transmitting signals after a modulation process, and a receiving unit 143 for demodulating received signals.

The first and second user input units 115 and 116 have a configuration shown in FIG. 1, and provide, to the controller 140, key input data input by a user so as to control the operation of the portable terminal.

The camera 121 (video input unit) processes image frames such as still images or moving images captured by an image sensor in a video-call mode or a capturing mode. Then, the processed image frames are converted to image data that can be displayed on the display unit 114, thereby being output to the display unit 114.

Image frames processed by the camera 121 are stored in the memory 144 under control of the controller 140, or are transmitted to outside through the wireless communication module 141.

The audio input unit 117 receives an external audio signal through a microphone in a call mode, or a recording mode, or a voice recognition mode, and the like, and then processes the received signal into electric voice data. In the case of a call mode, the processed voice data is converted into data that can be transmitted to the base station through the wireless communication module 141, and then is output to the wireless communication module 141. In the case of a recording mode, the processed voice data is output so as to be stored in the memory 144.

The audio input unit 117 may include assorted noise removing algorithms to remove noise generated in the course of receiving the external audio signal.

The display unit 114 may output information processed in the portable terminal. For example, when the portable terminal is operating in a phone call mode, the display unit 114 will provide a User Interface (UI) or a Graphic User Interface (GUI) which includes information associated with the call. As another example, if the portable terminal is in a video call mode or a capturing mode, the display unit 114 may display captured images, or UI or GUI under control of the controller 140. In the case that the display unit 114 includes a touch screen, the display unit 114 may be used as an input device as well as an output device.

In a call mode or a recording mode, a voice recognition mode, a broadcasting signal reception mode, and the like, the audio output unit 122 converts audio data received from the wireless communication module 141, or audio data stored in the memory 144, under control of the controller 140. Then, the audio output unit 122 outputs the converted data to outside.

The audio output unit 122 outputs audio signals relating to functions performed in the portable terminal, such as sound indicating a call signal reception, or sound indicating a message reception.

The sensing unit 146 senses a current status of the portable terminal such as an open/close status of the portable terminal, a position of the portable terminal, or whether a user has contacted the portable terminal, thereby generating sensing signals to control the operation of the portable terminal. For instance, when the portable terminal is implemented as a slide phone, the sensing unit 146 senses whether the slide phone has been opened or not, and outputs a result of the sensing thereby to control the operation of the portable terminal. Furthermore, the sensing unit 146 performs sensing functions relating to whether power has been supplied from the power supply unit 119, or whether the interface unit 118 has been coupled to an external device, and the like.

Furthermore, the sensing unit 146 may sense rotation of the camera body 120 with respect to the terminal body 110, into the second status from the first status, and output a result of the sensing to the controller 140. Once a corresponding signal is applied to the controller 140, the controller 140 may control the mode sets 128 and 133 relating to the operation of the camera 121 to be output to the display unit 114.

The interface unit 118 interfaces a wire/wireless headset, an external charger, a wire/wireless data port, a card socket (e.g., memory card, SIM/UIM card), and the like, with any types of external devices connected to the portable terminal. The interface unit 118 transmits data or power received from external devices, to each component in the portable terminal, or transmits data in the portable terminal to the external devices.

The memory 144 may store programs to be processed and controlled by the controller 140, or may temporarily store input/output data (e.g., phonebook, messages, still images, moving images, etc.).

The memory 144 may store programs to control the operation of the portable terminal according to the present invention.

The memory 144 may be implemented using any type of suitable storage medium including a flash memory type, a hard disk type, a multimedia card micro type, a memory card type (e.g., SD or DX memory), Random Access Memory (RAM), Read-Only Memory (ROM), and the like.

The broadcasting signal reception module 145 receives broadcasting signals transmitted through satellite or terrestrial wave, and then converts them to broadcasting data that can be output to the display unit 114, thereby outputting the broadcasting data to the controller 140. The broadcasting signal reception module 145 receives broadcasting-related additional data (e.g., Electric Program Guide: EPG, channel list, and the like). Broadcasting data and additional data converted by the broadcasting signal reception module 145 may be stored in the memory 144.

The power supply unit 119 receives inner or outer power, and supplies the power to each component of the portable terminal under control of the controller 140.

The portable terminal according to the present invention has the following advantages.

Firstly, the camera body is rotatably coupled to the terminal body, and the camera manipulation unit configured to manipulate the camera is provided at the camera body. Accordingly, a user can more conveniently capture photos or moving images.

Secondly, since the touch screen is implemented by providing the touch input unit at the display unit, various manipulation environments can be provided to a user.

Thirdly, since the camera body is connected to the terminal body so as to be rotatable in two directions, subjects located at various angles can be captured by a single camera.

Fourthly, since the mode set relating to a function of the camera is output to the display unit when the camera body is rotated, can be provided more convenient user interface environments in capturing photos or moving images.

Fifthly, since the hinge module for stopping the camera body being currently rotated at a certain angle is provided between the camera body and the terminal body, the portable terminal can have a stable structure when performing a call or using the camera.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
    a terminal body including at least one wireless communication function;
    a display unit positioned on the terminal body and configured to display visual information related to a capturing mode of the portable terminal;
    a touch input unit provided at the display unit and configured to receive touch inputs for inputting information when at least one of the displayed visual information is touched;
    a camera body rotatably coupled to the terminal body and arranged in a longitudinal direction in relation to the terminal body;
    a camera mounted in the camera body and arranged such that a viewing direction of the camera rotates in a perpendicular direction in relation to the longitudinal direction when the camera body is rotated;
    at least one camera manipulation unit positioned on the camera body and configured to receive manipulations for inputting at least one command for operating the camera; and
    a hinge module positioned between the terminal body and the camera body, the hinge module configured to stop rotation between the camera body and the terminal body at preset angles,
    wherein the camera body is aligned with the terminal body such that the portable terminal has a bar-type configuration when the portable terminal is in a first status,
    wherein the camera body is oriented at a 90° angle in relation to the terminal body when the portable terminal is in a second status,
    wherein the viewing direction of the camera is perpendicular to a display direction of the display unit when the portable terminal is in the first status, and
    wherein the hinge module comprises:
        a first hinge member coupled to the terminal body or the camera body;
        a second hinge member coupled to the other of the terminal body or the camera body;
        a cam member fixedly coupled to the first hinge member, the cam member including stopping grooves extending in a radial direction on a periphery surface of the cam member; and
        an elastic stopper fixedly coupled to the second hinge member and configured to rotate with the second hinge member, the elastic stopper including protrusion members biased toward the cam member and configured to lock into the stopping grooves when rotatably aligned with the stopping grooves.

2. The portable terminal of claim 1, wherein the at least one camera manipulation unit comprises a plurality of camera manipulation units arranged in a row in a longitudinal direction in relation to the camera body.

3. The portable terminal of claim 1, wherein:
    the terminal body comprises an upper side and a lower side; and
    the camera body is coupled to the lower side of the terminal body.

4. The portable terminal of claim 1, wherein:
    the camera body comprises a front surface and a rear surface;
    the at least one camera manipulation unit comprises a plurality of camera manipulation units;
    a first camera manipulation unit of the plurality of camera manipulation units is mounted to the front surface of the camera body; and a second camera manipulation unit of the plurality of camera manipulation units is mounted to the rear surface of the camera body.

5. The portable terminal of claim 1, wherein the at least one camera manipulation unit is configured to receive input commands relating to a wireless communication function of the at least one wireless communication function when the portable terminal is in the first status.

6. The portable terminal of claim 5, wherein:
the display unit is further configured to display soft keys representing at least text, numbers, or symbols, and
the at least one camera manipulation unit is configured to receive at least a call command, a cancel command, or an end command.

7. The portable terminal of claim 1, wherein the at least one camera manipulation unit is configured to receive input commands, when the portable terminal is in the second status, to at least capture a subject for displaying via the display unit, to control a size of a the subject displayed via the display unit, or to reproduce captured photos or moving images.

8. The portable terminal of claim 7, wherein:
the camera body comprises a first end and a second end, the second end positioned opposite the first end;
the camera is mounted in the first end of the camera body; and
the at least one camera manipulation unit comprises a shutter key positioned in the second end of the camera body.

9. The portable terminal of claim 1, wherein the display unit is further configured to display at least one selectable item configured for receiving input when the camera body is rotated to change the portable terminal from the first status to the second status, the input received via the at least one selectable item for setting a mode of the portable terminal related to at least one camera function.

10. The portable terminal of claim 9, wherein:
the camera body is rotatably coupled to the terminal body in two directions, and
the second status comprises:
a forward rotation status in which a viewing direction of the camera is opposite to a display direction of the display unit; and
a backward rotation status in which the viewing direction of the camera is the same as the display direction of the display unit.

11. The portable terminal of claim 10, wherein the set mode comprises at least a photo capturing mode or a moving image capturing mode when the camera is in the forward rotation status.

12. The portable terminal of claim 10, wherein the set mode comprises at least a self photo capturing mode, a self moving image capturing mode or a video call mode when the camera is in the backward rotation status.

13. A portable terminal, comprising:
a terminal body including at least one wireless communication function;
a display unit positioned on the terminal body and configured to display visual information related to a capturing mode of the portable terminal;
a touch input unit provided at the display unit and configured to receive touch inputs for inputting information when at least one of the displayed visual information is touched;
a camera body rotatably coupled to the terminal body and arranged in a longitudinal direction in relation to the terminal body;
a camera mounted in the camera body and arranged such that a viewing direction of the camera rotates in a perpendicular direction in relation to the longitudinal direction when the camera body is rotated;
at least one camera manipulation unit positioned on the camera body and configured to receive manipulations for inputting at least one command for operating the camera; and
a hinge module positioned between the terminal body and the camera body, the hinge module configured to stop rotation between the camera body and the terminal body at preset angles,
wherein the camera body is aligned with the terminal body such that the portable terminal has a bar-type configuration when the portable terminal is in a first status,
wherein the camera body is oriented at a 90° angle in relation to the terminal body when the portable terminal is in a second status,
wherein the viewing direction of the camera is perpendicular to a display direction of the display unit when the portable terminal is in the first status, and
wherein the hinge module comprises:
a first hinge member coupled to the terminal body or the camera body;
a second hinge member coupled to the other of the terminal body or the camera body, the second hinge member including stopping grooves on a surface facing the first hinge member; and
an elastic stopper fixedly coupled to the first hinge member and configured to rotate with the first hinge member, the elastic stopper including protrusions protruding towards the second hinge member and configured to lock into the stopping grooves when rotatably aligned with the stopping grooves.

14. A portable terminal, comprising:
a terminal body including at least one wireless communication function;
a display unit positioned on the terminal body and configured to display visual information;
a camera body rotatably coupled to the terminal body and arranged in a longitudinal direction in relation to the terminal body;
a camera mounted in the camera body and arranged such that a viewing direction of the camera rotates in a perpendicular direction in relation to the longitudinal direction when the camera body is rotated;
a hinge module positioned between the terminal body and the camera body, the hinge module configured to stop rotation between the camera body and the terminal body at preset angles,
wherein the camera body is aligned with the terminal body such that the portable terminal has a bar-type configuration when the portable terminal is in a first status,
wherein the camera body is oriented at a 90° angle in relation to the terminal body when the portable terminal is in a second status,
wherein the viewing direction of the camera is perpendicular to a display direction of the display unit when the portable terminal is in the first status, and
wherein the hinge module comprises:
a first hinge member coupled to the terminal body or the camera body;
a second hinge member coupled to the other of the terminal body or the camera body;

a cam member fixedly coupled to the first hinge member, the cam member including stopping grooves extending in a radial direction on a periphery surface of the cam member; and an elastic stopper fixedly coupled to the second hinge member and configured to rotate with the second hinge member, the elastic stopper including protrusion members biased toward the cam member and configured to lock into the stopping grooves when rotatably aligned with the stopping grooves.

* * * * *